April 1, 1958     H. HARVEY     2,828,931
SKID FOR HANDLING MACHINERY
Filed May 21, 1954     2 Sheets-Sheet 1
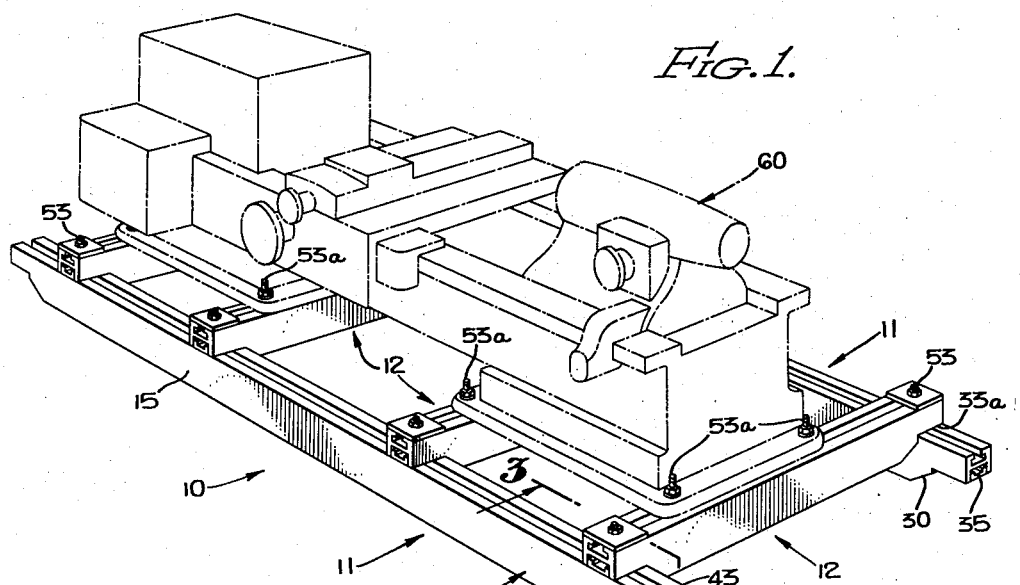
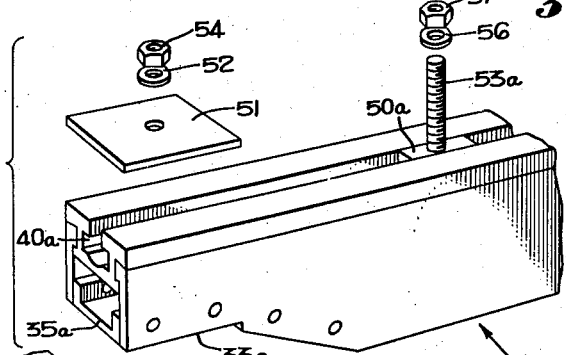
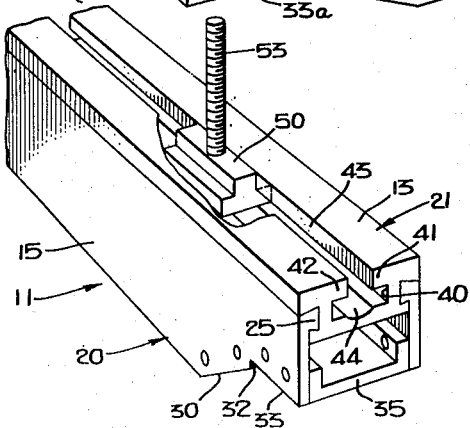
HERBERT HARVEY,
INVENTOR.
BY
ATTORNEYS April 1, 1958 — H. HARVEY — 2,828,931
SKID FOR HANDLING MACHINERY
Filed May 21, 1954 — 2 Sheets-Sheet 2

HERBERT HARVEY, INVENTOR.

BY *Lyon & Lyon*

ATTORNEYS

2,828,931
SKID FOR HANDLING MACHINERY

Herbert Harvey, Los Angeles, Calif., assignor to Harvey Machine Co., Inc., Torrance, Calif., a corporation of California Application May 21, 1954, Serial No. 431,495

2 Claims. (Cl. 248—119)

This invention relates to the shipment and handling of machinery or other articles of substantial bulk and weight, and has particular reference to a skid assembly and components thereof for handling such articles.

In the shipment and handling of machinery or like bulky and heavy articles, it is customary to secure the article to a heavy timber framework commonly known as a "skid."

Such skids usually consist of several longitudinal members of substantial cross section to which are secured, by bolting or otherwise, several cross members, likewise usually of substantial cross-section. The machine or other article to be transported is usually bolted securely to these cross members.

In the case of a machine mounted upon skid, it is essential that provision be made for lifting the article, as by a crane hoist, in order to place the article in or on a freight car, truck or other transport vehicle. In some instances, attachments for lifting are provided in or on the machine itself. In other instances, provision for attachment of hoisting cables must be made in or on the skid structure itself. Thus the skid structure itself must be of such substantial nature as will safetly support the machine while suspended from the hoisting rigging.

The use of relatively heavy timber for skids, while of almost universal application, has a number of disadvantages. The relatively large cross-sectional dimensions of the timbers combine to increase the overall height of the machine or article as shipped. The weight of the skid structure, too, adds considerably to the shipping weight, and hence to the cost of shipment. Furthermore, each such skid structure must be specially constructed to suit the size of the machine, and the positions of the holes in the base of the machine for the foundation bolts have to be drilled to suit each particular machine.

One of the principal objects of this invention is, therefore, to provide a novel skid structure which is not subject to the above-mentioned disadvantages of the conventional structures.

Another object of this invention is to provide a lightweight, compact skid structure composed of uniform members which may be readily assembled in varying sizes and configurations to fit varying job conditions.

Another object of this invention is to provide a novel skid structure consisting of a plurality of frame members of uniform cross section, the members being provided with means for securing the article to be handled thereto without the necessity for drilling holes in the frame members.

Another object of this invention is to provide a novel skid structure comprising a plurality of uniform frame members, the frame members having end portions of reduced cross section which serve the double function of reducing the overall height of the skid and facilitating handling thereof.

Other objects and advantages of this invention it is believed will be readily apparent from the following detailed description of preferred embodiments thereof when read in connection with the drawings.

In the drawings:

Figure 1 is a perspective view of a preferred embodiment of the invention.

Figure 2 is a fragmentary perspective exploded view illustrating the assembly of two of the frame members.

Figure 4:
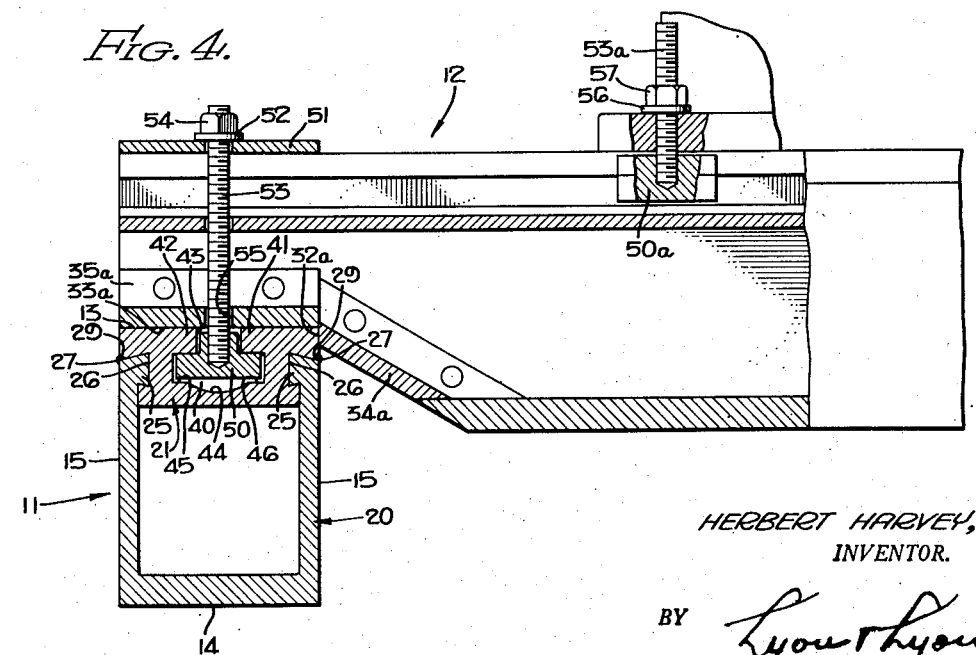
Figure 4 is a sectional elevation taken substantially on the line 4—4 of Figure 3.

Referring now to the drawings, a preferred form of the skid structure of this invention is generally indicated 10 and comprises a pair of longitudinal beam or frame members 11 and a plurality of transverse frame or cross-beam members 12. The members 11 are substantially identical and are generally rectangular in cross section having a top 13, a bottom 14 and side walls 15. As shown best in Figure 4, the frame members 11 are of two-piece construction, comprising a generally U-shaped bottom member 20 and a top member 21, both of a light metal such as aluminum. Preferably the members 20 and 21 are extruded to form the desired shapes, the bottom member 20 being provided with inwardly directed longitudinal flanges 25 suitably dove-tailed as shown to fit in the dove-tailed side grooves 26 formed in the top member 21. The top and bottom members are preferably welded together as at 27, the top member preferably being provided with a pair of longitudinal bevelled edges 29 to facilitate deposition of the weld.

The ends of the frame members 11 are of reduced cross section formed preferably by providing an upwardly inclined portion 30 forming the bottom of each of the side walls 15, the portions 30 terminating in relatively short vertical shoulder portions 32 which in turn lead to horizontal bottom portions 33. U-shaped bottom members 34 and 35 are secured to the end portions of the side walls by any convenient means, such as by riveting, to complete the assembly. Preferably the ends of the frame members are thus reduced to a vertical dimension of approximately one-half the vertical dimension of the main portion thereof, the reduced portions extending inwardly from the ends of the members a distance approximately equal to the width thereof.

The top member 21 of each of the frame members 11 is provided with a central longitudinal groove 40 generally of inverted T-shape, the overhanging top portions 41 and 42 forming the central, upper groove portion 43 of reduced width. Preferably the central portion of the groove bottom is curved as at 44 to form track surfaces 45 and 46.

The cross-beam members 12 are identical in configuration to the frame members 11 with the exception that in the embodiment shown, the members 12 are substantially shorter than the members 11. Like the frame members, the cross-beam members are provided with reduced end portions having horizontal bottom portions 33a and short vertical shoulder portions 32a, U-shaped bottom members 34a and 35a, and a central longitudinal T-slot or groove 40a.

Means are provided for adjustably assembling the frame members 11 and cross-beam members 12 into a skid structure of great rigidity and strength, and as shown in the drawings these means may include the stud nuts 50, which are T-shaped in cross section to be slidably received in the T-slots 40, apertured seating washers or plates 51, lock washers 52, stud bolts 53 and nuts 54, the bottom members 35a being provided with central apertures 55.

Similar means are provided for securing a machine such as the lathe 60, or other object having anchor bolt holes, to the skid structure. As shown in the drawings, the means may include the stud nuts 50a which are identical to the nuts 50, washers 56, stud bolts 53a, and lock nuts 57.

From the above description, it is believed readily apparent that a novel and highly superior skid structure has been provided. By virtue of the standardized and uniform frame members which are formed of lightweight metal, the assembly of any desired combination of longitudinal and transverse members to form a light yet strong skid structure of any desired size and configuration is possible, without the necessity of drilling holes or utilizing tools other than a wrench. The T-slot, slidable stud bolt combination, makes it possible to secure all types of articles to the skid, regardless of the positions of the anchor holes in the articles. The reduced end portions of the longitudinal frame members provide a convenient seating for hoisting slings, cables or similar lifting rigging, and the reduced end portions of the cross-beams act to reduce the overall height of the assembled skid structure to substantially one and one-half times the height of a single beam. A comparable reduction in assembled skid height cannot as conveniently be obtained by similarly notching or cutting the ends of conventional timber members due to the inherent tendency of the timbers to split longitudinally and to thus become weakened when subjected to heavy loadings.

Figure 3:
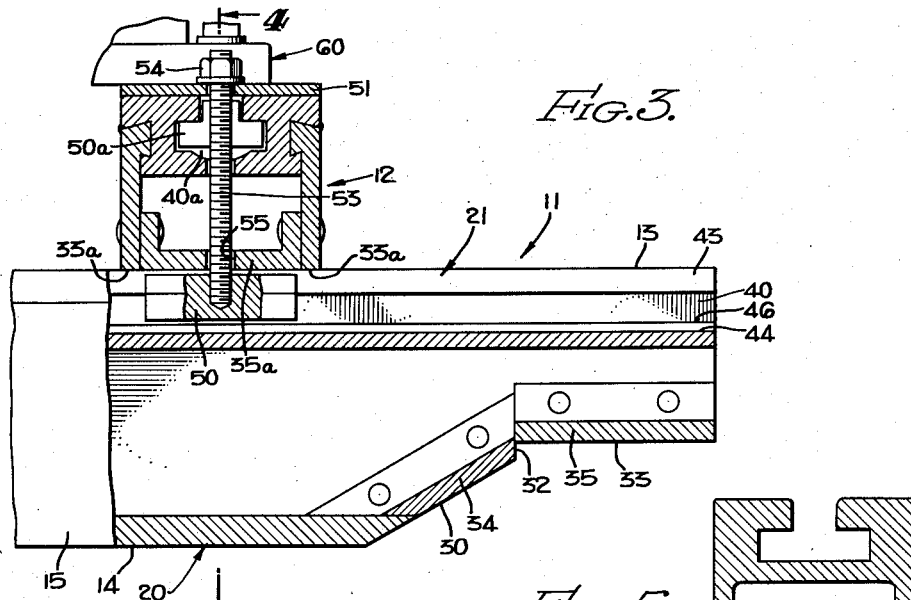
Figure 3 is a sectional elevation taken substantially on the line 3—3 of Figure 1.
Figure 5:
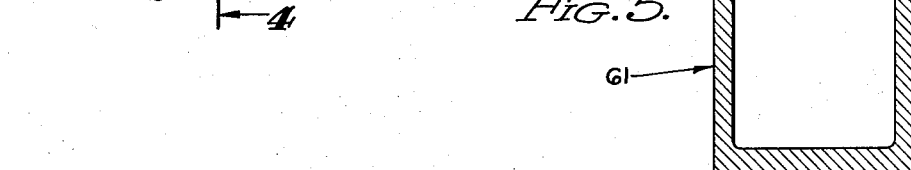
Figure 5 is a vertical cross section of a frame section constructed in accordance with a modified form of the invention.

A modified form of frame member 61 is illustrated in Figure 5. The member 61 is generally similar to the frame members 11 and 12 with the exception that it is formed of a one-piece extrusion.

While specific embodiments of the present invention have been shown and described, it is not intended to limit the same to the exact details of the construction set forth, and they embrace such changes, modifications and equivalents of the parts and their formation and arrangement as come within the purview of the appended claims.

I claim:

1. In a skid assembly, the combination of a plurality of separate longitudinal and transverse frame members forming a generally rectangular structure, bolt and nut assemblies securing said transverse frame members to said longitudinal frame members in overlying relation thereto, each of said longitudinal frame members being provided with a longitudinal undercut groove in and extending the length of its upper surface, an element of each of said bolt and nut assemblies being slidable in said grooves for longitudinal adjustment of said transverse members along said longitudinal members, bolt and nut assemblies for securing an article to said skid assembly, each of said transverse frame members being provided with a longitudinal undercut groove in and extending the length of its upper surface, an element of said last-mentioned bolt and nut assemblies being slidable in said last-mentioned grooves, and means preventing disassembly of said nuts from said grooves.

2. In a skid assembly, the combination of a plurality of separate longitudinal and transverse frame members forming a generally rectangular structure, said frame members each being provided with straight upper surfaces, the end portions of the lower surfaces being upwardly offset to provide end portions of reduced vertical dimension, the reduced ends of the transverse members resting upon the upper surfaces of said longitudinal frame members, bolt and nut assemblies securing said transverse frame members to said longitudinal frame members, each of said longitudinal frame members being provided with a longitudinal undercut groove in and extending the length of its upper surface, an element of each of said bolt and nut assemblies being slidable in said grooves, and means preventing disassembly of said nuts from said grooves.

References Cited in the file of this patent

UNITED STATES PATENTS

| | | |
|---|---|---|
| 620,561 | Bettendorf | Mar. 7, 1899 |
| 1,211,352 | Rathburn | Jan. 2, 1917 |
| 1,586,053 | Snyder | May 25, 1926 |
| 1,780,277 | Seeley | Nov. 4, 1930 |
| 2,631,800 | Pinkston | Mar. 17, 1953 |
| 2,685,964 | Brown | Aug. 10, 1954 |